Feb. 12, 1952   J. D. SCHWARTZ   2,585,858
ARTIFICIAL TOOTH WITH RETENTION MEANS
Filed April 28, 1948

*Inventor*
*Jacob D. Schwartz*

Patented Feb. 12, 1952

2,585,858

UNITED STATES PATENT OFFICE 2,585,858

ARTIFICIAL TOOTH WITH RETENTION MEANS

Jacob D. Schwartz, Pittsburgh, Pa.

Application April 28, 1948, Serial No. 23,695

1 Claim. (Cl. 32—10)

This invention relates to new and useful improvements in artificial teeth of the type which are used in making dentures having a plastic base, and has for its principal object provision of means for better retention of teeth in the investment material during the construction of a denture.

In constructing dentures, the first step is to make a cast of the jaw, which is done by taking an impression thereof and filling the impression with a hard plaster. On this cast of the jaw is placed a layer of wax, called the wax baseplate, and into this wax base-plate are placed artificial teeth, which are arranged in position to meet the requirements of the particular patient for whom the denture is constructed.

The next step is called processing the denture, which consists of changing the wax replica of the denture to a more durable substance such as a plastic material. To accomplish this end, the waxed-up denture is placed in a metal flask and soft plaster of Paris, which in this case, is called the investment material, is poured around the teeth and wax model. When the soft plaster of Paris has set and become hard, the wax is melted out, leaving the artificial teeth imbedded in the investment plaster. The mold cavity formed by melting out the wax is then filled with soft plastic material, and under heat and pressure it is cured and hardened to form the finished denture.

When the wax is melted out of the flask, it is presumed that the investment plaster will retain the teeth in the flask in the exact relative position which they were so laboriously and painstakingly placed in the wax base-plate. Unfortunately, this is not always the case. Due to the taper and glassy character of the surfaces of the teeth, some teeth will manage to loosen from the investment plaster. There is then added work in cleaning the loosened teeth and cementing them back into position in the investment plaster, and sometimes, because they are not accurately replaced, there is added work in the finished denture to correct the error.

In most cases of partial denture construction it is highly advantageous to invest the teeth in the same flask section which contains the cast. However, this manner of investment places the teeth out of view and reach and a loosened tooth presents a difficult situation.

If a flask such as is described in my Patent Number 2,432,820 is used, wherein the invested teeth are not quite so accessible or visible as in cases where standard flasks are used, it is quite difficult to know whether any teeth have worked loose from the investment plaster and if they have, it is equally difficult to replace them in their proper places.

It is therefore an object of this invention to provide an artificial tooth having an outwardly extending protuberance formed on an axial surface thereof, whereby when the tooth is invested in plaster of Paris the protuberance will become anchored therein and prevent the tooth from being displaced from its position in the investment material. This and other objects will be more readily understood from the following description and drawing in which like reference characters in the several views represent the same thing and in which.

In operation, the denture is waxed-up in the usual manner and invested in a flask section 1 using plaster of Paris 2 as the investment material. The plaster of Paris will flow around the protuberances 4 and 5 and will anchor the teeth in their invested position in the flask. After the investment has hardened, the wax is melted out, and replaced with plastic material which is to form the finished denture base. The case is then processed, following which the denture is removed from the flask and investment material. After the denture has been recovered, the protuberances 4 and 5 are ground away with a small emory wheel and the roughened area is then made smooth by polishing with pumice stone or the like.

Figure 1:
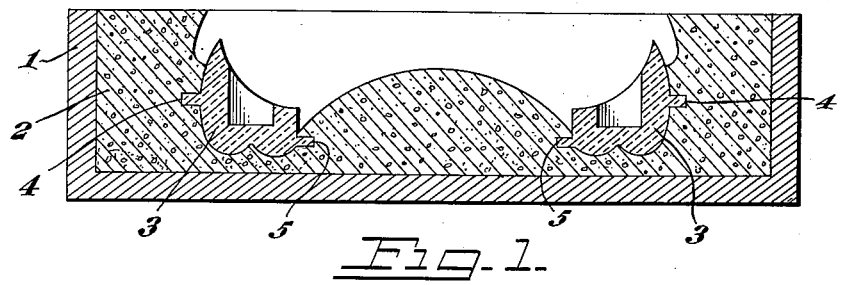
Fig. 1 is a cross-sectional view of a flask section in which a waxed-up denture was invested, the wax being melted out and the teeth remaining showing their protuberances anchored in the investment material.
Figure 2:
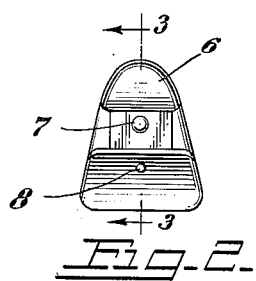
Fig. 2 represents a lingual view of an anterior tooth showing a lingual protuberance.
Figure 3:
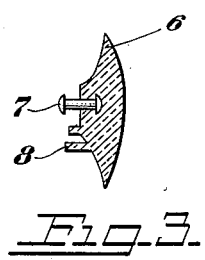
Fig. 3 represents a cross-sectional view of the tooth in Figure 2, looking in the direction of the arrows.
Figure 4:
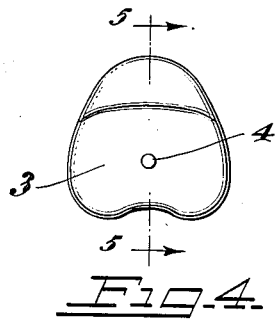
Fig. 4 represents a buccal view of a molar tooth showing a protuberance on its surface.
Figure 5:
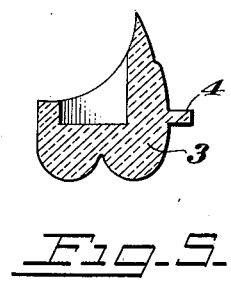
Fig. 5 represents a cross-sectional view of the tooth in Figure 4, looking in the direction of the arrows.

On anterior teeth, one protuberance such as 8 in Figures 2 and 3 is usually sufficient to efficiently anchor the tooth in the investment. This protuberance may be placed on any of the axial surfaces, that is, the surfaces which run substantially parallel to the long axis of the tooth, to wit, the labial, lingual, buccal, mesial and distal surfaces. If placed on the lingual surface of an upper anterior tooth, the protuberance should be near the gingival line, where it will not interfere with articulation, but on a lower anterior tooth it may be placed anywhere on the lingual surface because it cannot interfere with articulation.

On molar teeth, while one protuberance is usually sufficient, two or more will give added assurance that the tooth will not move in the investment material, however rough the case may be handled. If two protuberances are used, they may both be placed on the same axial surface such as the buccal surface, or one on the buccal and the other on the lingual surface, etc.

Figure 6:
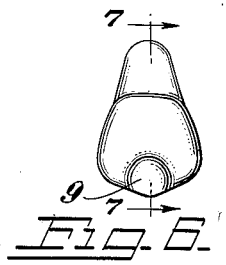
Fig. 6 is a buccal view of a bicuspid tooth, showing a raised area closely adjacent the occlusal surface.
Figure 7:
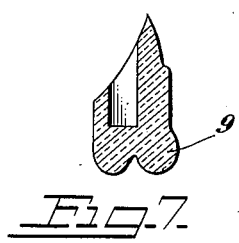
Fig. 7 is a cross-sectional view of the bicuspid tooth shown in Figure 6 and shows the raised area on the buccal surface closely adjacent the occlusal surface.

The protuberances shown in Figures 1 to 5 are small cylindrical fingers extending outwardly from axial surfaces. However, they may have any other form. Another form 9 in Figures 6 and 7 is a raised area or bulbous protuberance on the buccal surface of a posterior tooth. This type of protuberance does not ordinarily extend out as far as the cylindrical type nor is it as well defined, however, if properly located, it is very effective as an obstruction for preventing the displacement of the tooth.

This type of protuberance may be so designed and located that it will blend with the general contour of the tooth and not require being cut from the tooth when construction of the denture is finished. The mere presence of a bulbous or raised area on the buccal surface of a posterior tooth is no assurance that the tooth will not be displaced from its invested position. After considerable research, I found that when teeth are displaced from their invested position in plaster of Paris, they invariably are not moved out in a direction parallel with the long axis of the tooth, but rather, they are rotated out, the fulcrum being in the area of the short lingual surface of the tooth. I have also found that if the raised area is located near the gingival line on the buccal surface of a posterior tooth, or if it extends from the gingival line to the occlusal surface it will offer little or no resistance to the tooth being rotated out of its position in the investment material. However, if the bulbous or raised area on the buccal surface is located closely adjacent the occlusal surface, there would be established a definite undercut and obstruction to removing the tooth from the investment material, by rotation or otherwise Figures 6 and 7 show the raised area 9 in its preferred form which is substantially circular at its base, and which is located closely adjacent the occlusal surface, which affords maximum resistance to displacement, however, it may be spaced slightly from the occlusal surface without losing too much of its effect as a resistance to displacement.

While the extending protuberances 4, 5 and 8 are of sufficient length to be effective on any axial surface at any location thereon, their effect as resistance to displacement of the tooth would be greatly increased if they were also placed on the buccal surface closely adjacent the occlusal surface.

The tooth 3, or tooth body as it is called in this invention, may be formed of porcelain or any suitable material.

7 is a metal retaining pin such as is normally found in anterior teeth.

It is generally known in the prosthetic branch of dentistry that the areas of the axial surfaces of a tooth which are located from the gingival line apically to the end of the tooth are normally covered by the base plate when the tooth is in the denture. Therefore the protuberance provided in this invention is located on areas of the axial surfaces which are normally not covered by the base plate in order that the protuberance may be cut from the tooth when the denture is completed, without leaving evidence of its former location.

Having described the invention in one of its preferred embodiments, it being distinctly understood that other types of structure may be formed without departing from the spirit of the invention, I claim:

An artificial tooth, for use in artificial dentures having a plastic base, comprising a tooth body, said tooth body having a raised area on its buccal surface located closely adjacent the occlusal surface of said tooth, said raised area being of sufficient height to constitute a definite obstruction to prevent displacement of said tooth from its invested position when invested in plaster of Paris.

JACOB D. SCHWARTZ.

REFERENCES CITED

The following references are of record in the file of this patent:

UNITED STATES PATENTS

| Number | Name | Date |
|---|---|---|
| 1,315,997 | Smith | Sept. 16, 1919 |
| 1,333,007 | Withycombe | Mar. 9, 1920 |
| 2,011,477 | Fischer | Aug. 13, 1935 |
| 2,416,983 | Dickson | Mar. 4, 1947 |

FOREIGN PATENTS

| Number | Country | Date |
|---|---|---|
| 588,490 | Great Britain | May 22, 1947 |